(12) United States Patent
Schlichting (10) Patent No.: US 10,926,908 B2
(45) Date of Patent: Feb. 23, 2021

(54) WRAPPING APPARATUS AND METHOD WITH A WRAPPING MONITORING SENSOR

(71) Applicant: Forage Innovations B.V., Maassluis (NL)

(72) Inventor: Malte Cornelius Schlichting, Maassluis (NL)

(73) Assignee: FORAGE COMPANY B.V., Maassluis (NL)

( * ) Notice: Subject to any disclaimer, the term of this patent is extended or adjusted under 35 U.S.C. 154(b) by 788 days.

(21) Appl. No.: 15/247,549

(22) Filed: Aug. 25, 2016

(65) Prior Publication Data

US 2017/0057680 A1   Mar. 2, 2017

(30) Foreign Application Priority Data

Aug. 26, 2015  (NL) .................................... 2015350

(51) Int. Cl.
| | | |
|---|---|---|
| *B65B 57/18* | (2006.01) | |
| *A01F 15/07* | (2006.01) | |
| *B65B 11/04* | (2006.01) | |
| *B65B 41/16* | (2006.01) | |
| *B65B 27/12* | (2006.01) | |
| *B65B 57/02* | (2006.01) | |
| *G06K 7/10* | (2006.01) | |

(52) U.S. Cl.
CPC ............ *B65B 57/18* (2013.01); *A01F 15/071* (2013.01); *A01F 15/0715* (2013.01); *B65B 11/04* (2013.01); *B65B 27/125* (2013.01); *B65B 41/16* (2013.01); *B65B 57/02* (2013.01); *G06K 7/10425* (2013.01); *A01F 2015/076* (2013.01); *A01F 2015/0745* (2013.01)

(58) Field of Classification Search
CPC ......... B65B 57/02; B65B 57/18; B65B 41/16; A01F 2015/076; A01F 15/0715; A01F 15/071; A01F 2015/0745; B29C 61/0608; B29C 65/00; B65D 65/00
USPC .......................................................... 53/410
See application file for complete search history.

(56) References Cited

U.S. PATENT DOCUMENTS

| | | | |
|---|---|---|---|
| 6,370,852 B1 | 4/2002 | Ohlemeyer et al. | |
| 6,981,352 B2 * | 1/2006 | Chow ................. | A01F 15/0715 53/118 |
| 7,694,491 B2 | 4/2010 | Noonan et al. | |
| 2002/0124529 A1 | 9/2002 | van der Lely | |

(Continued)

FOREIGN PATENT DOCUMENTS

| | | |
|---|---|---|
| DE | 100 11 158 A1 | 9/2001 |
| EP | 1 053 673 A1 | 11/2000 |
| EP | 1 842 417 B1 | 9/2009 |

*Primary Examiner* — Thanh K Truong
*Assistant Examiner* — Katie L Gerth
(74) *Attorney, Agent, or Firm* — Birch, Stewart, Kolasch & Birch, LLP (57) ABSTRACT

A wrapping apparatus and A wrapping method are provide to wrap an object in a chamber into a web of wrapping material. The web is moved from a reservoir outside of the chamber. A tag applicator applies a tag on the web in an application position which is between a wrapping material reservoir and a wrapping material inlet. A tag reader monitors whether or not a tag is conveyed in the chamber along the tag reader. If no tag is detected, an alert is generated that the object is not properly wrapped.

21 Claims, 2 Drawing Sheets

(56) References Cited

U.S. PATENT DOCUMENTS

| | | | |
|---|---|---|---|
| 2003/0089081 A1* | 5/2003 | Platon | A01F 15/071 53/399 |
| 2004/0182043 A1 | 9/2004 | Viaud et al. | |
| 2004/0221547 A1* | 11/2004 | Anstey | A01F 15/0715 53/399 |
| 2007/0240389 A1 | 10/2007 | Frerichs | |
| 2009/0107348 A1* | 4/2009 | Noonan | A01D 87/127 100/8 |
| 2009/0107349 A1 | 4/2009 | Noonan et al. | |
| 2009/0217827 A1 | 9/2009 | Duenwald et al. | |
| 2010/0003118 A1 | 1/2010 | Noonan et al. | |
| 2012/0048129 A1* | 3/2012 | Smith | A01F 15/08 100/2 |
| 2012/0186197 A1 | 7/2012 | Potempa et al. | |
| 2012/0266763 A1* | 10/2012 | Foster | A01F 15/0715 100/2 |
| 2013/0305658 A1* | 11/2013 | Smith | A01F 15/08 53/135.1 |
| 2014/0157999 A1* | 6/2014 | Verhaeghe | A01F 15/08 100/3 |

* cited by examiner

WRAPPING APPARATUS AND METHOD WITH A WRAPPING MONITORING SENSOR

FIELD OF THE INVENTION

The invention refers to a wrapping apparatus and to a wrapping method for wrapping a surface of an object in a chamber and for monitoring whether the object surface is actually wrapped, in particular for wrapping on board of a round baler the circumferential surface of a round-cylindrical bale made from loose agricultural material and for monitoring the wrap.

BACKGROUND OF THE INVENTION

The task of wrapping an object occurs in particular for an agricultural bale serving as the object to be wrapped. A bale forming and wrapping apparatus as used for agricultural purposes picks up loose crop material from the ground, injects the picked-up crop material into a drum-shaped or cuboid bale forming chamber, forms from the injected crop material under pressure a bale, wraps at least one surface of the bale in the bale forming chamber into a web of wrapping material, severs the web, and ejects the wrapped bale out of the bale forming chamber. Without wrapping the bale surface in the chamber the ejected bale would fall apart.

Due to a malfunction the undesired event can occur that the bale surface in the bale forming chamber is not wrapped at all or that the bale surface is not wrapped properly into the web. It is in particular possible that the web of wrapping material is neither pulled nor otherwise taken from a reservoir of wrapping material or that the web is not injected into the bale forming chamber or is guided out of the bale forming chamber.

It is desired to automatically detect this undesired event such that suitable measures can be taken. Several proposals for tackling this task were made.

DE 10011158 A1 discloses a baler which wraps a bale in a bale forming chamber (Pressraum 6) into a web (Materialbahn 26) of wrapping material. Three sensors 40, 41, 42 can discover three different kinds of wrapping malfunctions. A first sensor 40 detects the undesired event that the web 26 wraps around a conveyor rotor (Förderrotor 23) above the feeding channel. A second sensor 41 detects the undesired event that the web 26 wraps around a pulling roller (Abzugswalze 30, 31) between the supply reel (Vorratsrolle 32) and the wrapping material inlet (Spalt 27). A third sensor 42 detects the undesired event that the web 26 wraps around a pressing roller (Presswalze 28) in the bale forming chamber 6.

US 2004/0182043 A1 (also published as U.S. Pat. No. 6,966,162 B2 and as EP 1461995 B1) discloses a round baler 10 which creates a round bale 16 in a baling chamber 12. The circumferential surface of the bale 16 in the baling chamber 12 is wrapped into a wrapping sheet 18 which is taken from a supply reel 28. The wrapping sheet 18 is injected into the baling chamber 12 through a wrapping sheet feed location 21.

In the preferred embodiment of US 2004/0182043 A1 the baling chamber 12 is surrounded by a plurality of pressing rollers 20. Two wrapping sensors 42, 44 are positioned adjacent to the circumferential surface of the round-cylindrical bale 16. These two sensors 42 and 44 are positioned such that the feed location (inlet) 21 is between the two sensors 42 and 44. If the sheet 18 is properly taken by the rotated bale 16, the sheet 18 on the circumferential bale surface is first conveyed along the sensor 42 and afterwards conveyed along the sensor 44.

US 2004/0182043 A1 mentions several kinds of wrapping sensors, cf. par. [0029], e.g. optical sensors, mechanical sensors, distance sensors, ultrasound sensors, proximity sensors, light barriers, infrared sensors, or a combination of different sensor types. If one sensor 42 or 44 detects that no wrapping material is present on the bale circumferential surface, a signal is generated and transmitted to a control unit ECU.

U.S. Pat. No. 7,694,491 B2 (also published as US 2009/0107349 A1) discloses a cotton harvester which forms a cotton module (bale) 94 in a module-forming chamber 38. A tensioning arm arrangement 66 tensions several parallel module-forming belts 50 which surround the module-forming chamber 38. The cotton module 94 is wrapped by a module or bale wrapping apparatus 80 which is mounted to a rear wall of the discharge gate 46 of the chamber 38 and holds a material supply roll 84. A web of wrapping material 86 is inserted into the chamber 38 through a nip between the wrap material feed rolls 88 and 90. The injected wrapping material 86 is clamped between the module-forming belts 50 and a completed cotton module 94 in the baling chamber 38.

The web of wrapping material 86 is manufactured and provided such that the wrapping material 86 includes a plurality of electronic identification tags, e.g. radio frequency identification (RFID) tags, cf. FIG. 2. The wrapping material 86 is formed as a sequence of several identical segments 106 each comprising three RFID tags 112, 114, 116. An RFID tag reader 120 is mounted at an upper rear location of the frame 12 adjacent to a wrapping material guide structure 92, cf. FIG. 1. A further RFID tag reader 122 is positioned adjacent to the crop material inlet 40 of the chamber 38. Every tag reader 120, 122 can detect the presence of an RFID tag 112, 114, 116 on the wrapping material 86. The tag reader 120 detects an RFID tag after one layer of wrap is placed around a module 94. Yet a further RFID tag reader 124 is mounted near the top of the module forming apparatus, cf. FIG. 1. Every tag reader 120, 122, 124 sends signals to a board computer 170. This board computer 170 activates a motor 146 for the severing device 130 which severs the wrapping material.

In the event that no RFID tag is identified within a certain time, a warning device 174 generates an alert to the operator. The operator is thereby notified that the cotton module 94 is not properly wrapped. The RFID tags and the tag readers 112, 114, 116 can further be used for monitoring the length of the web pulled from the reel. The operator can be informed how many web segments 106 are still left on a supply roll 84. The RFID tags 112, 114, 116 can be set up to correlate a wrapped module 94 with other information, e.g. the kind of crop material, the module diameter and weight and moisture, the current geo-position, or the field number. As at least three RFID tags are placed on a wrapped cotton module 94, at least one RFID tag is not in contact with the ground after depositing the module 94 onto the ground and can therefore be detected.

Several proposals were made how to attach a storage medium to a bale and or how to store data about the bale on it.

EP 1842417 B1 discloses a baler (Rundballenpresse 1) which wraps a round bale in the pressing chamber (Ballenpressraum 5) into a web of wrapping material (Bindematerial 7). Several storage elements (elektronische Speichermedien 10) are mounted on the web 7. Data about the bale 6 is stored on a storage element 10. The data is later read and used for controlling the process of handling the wrapped bale 6.

U.S. Pat. No. 6,370,852 B1 discloses a baler 10 which forms round-cylindrical bales 26 and ejects them out of a baling chamber. Several sensors measure different properties of the bale or operating parameters of the baler 10, e.g. the weight and the diameter of the bale, the vertical load applied onto the towing unit (tongue 16) of the baler 10, the rotational speed of the PTO shaft 32, the position of the tailgate (closed or open), the moisture of the crop material, and whether or not a wrapping process currently takes place (sensor 46). Data about the bale properties and/or the operating parameters is written on a transponder chip 54 by means of an antenna 56. An insertion device 58 is activated and inserts the transponder chip 54 into a bale 20, e.g. by attaching the chip 54 on the bale 20. A chip magazine 66 is mounted at a sidewall 29 of the baler 10. A reading device 60 can read out signals stored on the chip 54. In one embodiment the chips 54 are spike-like and can be attached to a bale 20.

EP 1053673 A1 discloses a baler with at least one sensor, in the embodiment several sensors 34 to 50. The or every sensor 34 to 50 measures a parameter of crop material 24 pressed to a bale 20. The measured crop material parameters are stored on an electronic storage medium, e.g. on a transponder chip 54 or microchip. An insertion device 52 attaches or applies this storage medium to the bale 20.

US 2013/0305658 A1 discloses a cuboid baler with a pre-pressing chamber 11, an oscillating plunger 1 and a tag dispenser 52. The tag dispenser 52 dispenses a tag 50 which is inserted to crop material 60 in the pre-pressing chamber 11.

US 2014/0157999 A1 discloses a cuboid baler which forms cuboid bales 103 in a pressing channel 16 by means of an oscillating plunger 62. The bale 103 is held together by at least one twine strand called a linear object 102. A knotter 101 ties the linear object 102. A tagger assembly 117 with a tagger 104 and a retaining element 120 places a label 108 around the linear object 102.

SUMMARY OF THE INVENTION

A problem solved by the invention is to provide a wrapping apparatus with the features of the preamble of claim 1 and a wrapping method with the features of the preamble of claim 20 wherein a wrapping malfunction can automatically be detected without the need of wrapping the object in the chamber into a specific web of wrapping material.

This problem is solved by a wrapping apparatus with the features of claim 1 and by a wrapping method with the features of claim 20. Preferred embodiments are specified in the depending claims.

The wrapping apparatus according to the invention comprises
 a chamber,
 an object moving device,
 a reservoir holder for holding a reservoir with wrapping material,
 a tag applicator, and
 at least one tag reader.

The chamber can contain an object to be wrapped. The reservoir holder and thereby the reservoir are positioned outside of the chamber. The object moving device can move an object in the interior of the chamber with respect to the reservoir holder.

A wrapping material inlet guides into the chamber. The wrapping apparatus can move a web of wrapping material towards the inlet and can inject the web through the inlet into the chamber.

The or every tag reader is mounted on board of the wrapping apparatus and can detect the presence of a tag conveyed along this tag reader and can generate an alert if no tag is detected. The or at least one tag reader is positioned such that it can detect a tag on the surface of an object to be wrapped in the chamber.

The tag applicator is mounted on board of the wrapping apparatus and can apply a tag onto a web of wrapping material in an application position. This application position is situated along the way of the web from the wrapping material reservoir held by the reservoir holder to the wrapping material inlet, i.e. outside of the chamber and before the moved web reaches the wrapping material inlet.

The wrapping apparatus according to the invention operates as follows and the wrapping method according to the invention comprises the following steps:

The object to be wrapped is contained in the chamber.
 The object moving device moves the object being in the interior of the chamber with respect to the reservoir holder and with respect to the or one tag reader adjacent to the object surface.
 A web of wrapping material is taken from the reservoir. The wrapping apparatus engages the web and moves it along the application position towards the wrapping material inlet.
 The tag applicator applies in the application position at least one tag onto the web.
 The web on which the tag has been applied or will be applied is injected through the wrapping material inlet into the chamber—provided that no malfunction occurs.
 The moved object to be wrapped and the object moving device together clamp and convey the injected web. Thereby a surface of the object in the chamber is wrapped into the injected web—provided that no malfunction occurs.
 The object surface which is wrapped (more precisely: is to be wrapped) is conveyed along the or along at least one tag reader. If no wrapping malfunction occurs, the or one applied tag is moved together with the object surface and the injected web on the object surface along the tag reader.
 The tag reader along which the object surface is conveyed monitors whether or not a tag is conveyed along the tag reader.
 If the tag reader does not detect a tag, an alert is generated. If the wrapping procedure is performed properly, the web on the object surface is moved together with the object and conveys the applied tag along the or one tag reader and the tag reader detects the tag. Not detecting the tag is caused by a malfunction of the wrapping procedure, in particular by the undesired event that the web is not moved at all or not injected into the chamber or loses contact with the object surface.

Advantages

Thanks to the feature that the object is wrapped in the chamber it is possible that the chamber keeps the object together while the object surface is wrapped and until the object surface is completely wrapped. Therefore it is possible to wrap an object comprising several parts, e.g. loose particles or several parts which are not connected with each other before the object surface is wrapped. The chamber protects the object from undesired environmental impacts, e.g. moisture.

Thanks to the invention the undesired event that the object surface in the chamber is not at all or not properly wrapped is automatically detected. This event is detected early, namely before the object is ejected or otherwise moved out of the chamber. The risk is reduced that the ejected object falls apart or is damaged due to a missing wrap. Thanks to the invention a malfunction can be detected quite early. The tag reader for the object surface can be positioned adjacent to the and downstream from the wrapping material inlet.

Thanks to the invention the undesired event that the object in the chamber is not properly wrapped can be detected without the need of partially or even fully opening the chamber. After opening the chamber it may not be possible to wrap the object surface. It is further possible but not necessary that a human operator visually inspects the object surface. Thanks to the invention it is possible to automatically detect the undesired event, often regardless of the available daylight or an artificial illumination source.

Thanks to the invention it is possible but not necessary to use a specific kind of wrapping material on which a tag is already mounted. In contrast every kind of wrapping material can be used which is suitable for wrapping the object surface while the object is in the chamber and which can carry a tag, in particular a usual net or plastic sheet which is taken from a supply reel held by an unrolling station or further reservoir holder of the wrapping apparatus. It is not necessary that the web on the supply reel already carries a tag.

The usual web and the tags can be transported in different manners and from different sources and at different time points to the wrapping apparatus. It is not necessary to exactly synchronize the amount of wrapping material with the number of tags.

A round or cuboid agricultural bale or further object can also be wrapped into several strands of twine while the object is in the chamber. Thanks to the invention it is possible to use usual twine rolls and to apply at least one tag onto a twine strand taken from a usual twine roll.

The feature that the presence or non-presence of a tag is automatically detected does not necessarily require a camera and an image processing unit or a mechanical sensor touching a surface of the object in the chamber. Nevertheless the presence of the tag can be detected in a contactless manner. A further disadvantage of a contact sensor is avoided, namely that a contact sensor must exactly be adjusted with respect to the object surface and the position of the object surface in the chamber may not exactly be known in advance. Thanks to the invention the detection of the undesired event does not depend on optical or mechanical properties of the wrapping material or of the object surface, in particular not on the color or contour or texture of the object surface or the wrapping material. It is not necessary to adapt the wrapping apparatus to a specific kind of wrapping material. In particular if the object is formed in the chamber itself from injected loose material, it is not necessary to adapt the wrapping apparatus to a specific kind of loose material to be pressed in the chamber to the object.

According to the invention the web of wrapping material is taken from a reservoir holder, e.g. from an unrolling station which rotatably holds a supply reel with wrapping material. Besides the higher costs and the higher risk of damage the usage of wrapping material on which a tag is already mounted when inserting it into the reservoir holder has a further disadvantage. If the tag is not mounted at the proper place of the web or if the web is not exactly inserted into the reservoir holder, the tag reader may generate a false alert: The web is properly conveyed and the object surface is properly wrapped but the tag on the web reaches the tag reader too late. Or the tag reader does not detect the tag due to the position of the tag with respect to the tag reader, e.g. due to a large distance. A further problem occurs if a first object has been wrapped and ejected and a further object is to be wrapped in the same chamber. The position of a tag already mounted on the web depends on the actual length of the web used for wrapping the first object. This actual length may not exactly be known, in particular if the same wrapping apparatus subsequently wraps objects with different dimensions.

The invention eliminates these risks: The tag applicator applies the tag during the wrapping operation for the object currently being in the chamber. In one implementation the length of the path from the application position via the wrapping material inlet to the or one tag adjacent to the chamber reader is given by the construction of the wrapping apparatus and does not vary during operation. In a further implementation the path length depends on a parameter which can easily be measured during operation, e.g. on a dimension of the object. The conveying velocity of the web is known or can automatically be measured during operation. Therefore the expected time span required between the steps of tag application and expected tag detection in the chamber is determined and can be used for adjusting and/or calibrating the tag reader such that the tag reader generates the alert as early as possible without producing false alerts.

Thanks to the invention every kind of wrapping malfunction can be detected. The invention is not limited to the detection of a malfunction occurring at a specific place, e.g. the malfunction that the web wraps around a specific roller or the web is not moved towards the wrapping material inlet. In particular those malfunctions which occur before and those which occur after injecting the web can automatically be detected.

According to the invention the tag applicator is positioned outside of the chamber containing the object to be wrapped. Therefore the tag applicator is not subjected to dirt and debris which can occur in the chamber which contains the object to be wrapped, in particular if the object is a bale made from agricultural or recycling material or further loose particles. It is easier to add further tags to the tag applicator, e.g. by filling a tag reservoir. In addition the position of the tag applicator outside of the chamber makes it easier to monitor the tag applicator and to perform maintenance for the tag applicator compared with a tag applicator positioned in the interior of a casing surrounding the chamber.

Thanks to the invention it is not necessary to inject the tag directly into the object or attach the tag directly to the object. Such a tag may not properly stick to the object. In particular if the object is an agricultural bale which is used as animal fodder, the tag may injure an animal eating the fodder.

The invention can be implemented on board of an existing wrapping apparatus without significant modifications of the existing wrapping apparatus. Often such a wrapping apparatus comprises a control unit executing control software. It suffices to add the tag applicator and the tag reader, to connect them with the control unit, and to amend the control unit such that the wrapping apparatus control unit can generate control inputs for the tag applicator and can process signals from the tag reader. It is not necessary to amend the object moving device or a device which moves the web.

PREFERRED EMBODIMENTS

Preferably a time span is given in advance or calculated during operation. The alert is generated if the time span has passed after a time span starting event has occurred and if the or one tag reader adjacent to the chamber does not detect a tag within this time span. The time span starting event can be one of the following events:

The web is moved.

The tag applicator applies the or the first tag on the web.

The web reaches the chamber and is injected into the chamber.

The time span can be determined and stored in advance, i.e. before the wrapping procedure starts, depending on at least some of the following parameters:

the length of the path from the application position to the wrapping material inlet, the conveying speed of a web feeding device conveying the web towards the wrapping material inlet, the length of the path from the wrapping material inlet to the tag reader along which the surface of the object in the chamber is conveyed, the conveying speed with which the object moving device moves the object surface, optionally an estimated slippage between the web feeding device and the web and/or between the object moving device and the object, and optionally a given tolerance value.

In one implementation the path lengths are known by the construction of the wrapping apparatus and do not vary during operation. In a further implementation the length of the path from the wrapping material inlet to the tag reader depends on a dimension of the chamber wherein the chamber dimension can vary from object to object to be wrapped. Therefore a measured maximal object dimension is used for calculating the path length. It is possible that the conveying velocity of the web and/or of the object surface varies during operation and is measured. In particular in this case it is possible to calculate the time span during operation depending on at least one measured velocity.

According to the invention an alert is generated if no tag is conveyed along the or one tag reader adjacent to the object surface in the chamber. In one embodiment this alert is communicated to a human operator. In one embodiment the step that the object to be wrapped is ejected out of the chamber is automatically inhibited, preferably until the operator triggers manually the object ejection. In one application several parts of the wrapping apparatus are automatically checked if no tag is detected.

In one application the wrapping material comprises a net or a plastic film. The tag is applied by clamping, gluing or otherwise attaching it onto the web. In a further application the web comprises at least one strand of twine. The tag is fixed onto the or onto one strand of twine.

In one embodiment the distance between the object surface to be wrapped and the tag reader which detects the tag on this object surface can be changed. This embodiment is in particular of advantage if the same wrapping apparatus according to the invention subsequently wraps surfaces of several objects with different dimensions in the chamber. In one implementation a sensor measures a dimension of the object to be wrapped, e.g. the diameter of a round-cylindrical object, or of the provided chamber. Or the dimension is entered by an operator. An actuator moves the tag reader with respect to the object such that the distance between the object surface and the tag reader is kept within a given range. This embodiment prevents the undesired event that the tag reader does not detect the tag and generates a false alert due to a high distance to the object surface. On the other hand this embodiment avoids the undesired event that the moved object touches the tag reader which may damage the tag reader.

Different embodiments how the web of wrapping material is engaged and thereby taken from the reservoir and is moved towards the wrapping material inlet are possible. The attaching of the tag at the web can automatically be improved during the wrapping operation depending on the selected embodiment. Several embodiments can be combined.

In one embodiment the web is conveyed to the wrapping material inlet by being pulled by a web pulling device, e.g. is conveyed between two pinch rollers or two yaws of a duckbill-like device. The web pulling device touches and clamps the web in a touching position which is—seen in the web conveying direction—preferably positioned downstream from the application position and upstream of the wrapping material inlet. Therefore the web pulling device touches the web to which at least one tag is already attached. The web pulling device additionally fixes the tag on the clamped web of wrapping material before the web is injected into the chamber.

In a further application a web pusher presses the web against the outer surface of a part belonging to the object moving device, e.g. against at least one endless pressing belt surrounding the chamber. The object moving device conveys the object and additionally the web which is pressed against the surface. Preferably the application position is upstream of that position at which the web is pressed against the object moving device. The web pusher also pressed the tag against the object moving device and further fixes the tag on the web.

In one embodiment the web is already tensioned before injecting it into the chamber. In a further embodiment the web remains slack until it is grasped and clamped in the chamber. In particular in the embodiment with the slack web the tag applicator cooperates with an opposing element, e.g. with a supporting plate. The web is conveyed through a nip between the tag applicator and the opposing element. This nip provides the application position. The tag applicator applies the tag and presses the web with the applied tag against the opposing element.

In one embodiment the tag applicator applies the tag before the moved web reaches the wrapping material inlet. This embodiment enables the detection of a malfunction as early as possible as the tag is attached close to the leading edge of the web. In a further embodiment the tag applicator applies the tag after the web has been injected into the chamber. If no malfunction occurs, the injected web is securely kept between the object and a part of the wrapping apparatus, e.g. the object moving device. In general the injected web is tensioned and is securely clamped and kept. Therefore the further embodiment makes it often easier to apply the tag.

According to the invention the injected web is clamped and grasped and thereby moved. In one embodiment the object moving device touches that surface of the object in the chamber which is to be wrapped. The web is clamped between the object moving device and the surface of the moved object. The clamped web is moved. In a further embodiment the object surface to be wrapped is moved along a wall of the chamber wherein this chamber wall does not belong to the object moving device. The moved object and the chamber wall clamp the injected web between them and convey the clamped web.

Different embodiments for the tag and therefore for the tag applicator and for the or every tag reader are possible. It is possible that several different tags are used for the same object.

In one embodiment that surface of the tag which points to the tag reader adjacent to the chamber has an optical property which distinguishes the applied tag from the object surface which is to be wrapped and is conveyed along the tag reader. It is possible but not necessary that the optical property distinguishes the tag from the web of wrapping material. The term "optical property" refers to a property which can be recognized in a given light spectrum by a suitable optical sensor. This optical property can be a geometrical shape or a specific optically detectable pattern or a specific color which is not present on the surface of the object to be wrapped. This color or shape or pattern can be detected in visible light or infrared or ultraviolet light. The tag reader can acquire and evaluate images in this light spectrum. Preferably the tag reader has a corresponding illumination source pointing to the object surface. Thanks to the illumination source the detection of the tag does not depend on the amount of daylight which is available in the chamber.

The tag surface can have a distinguishing reflecting property, e.g. a glossy surface or a phosphorescent or fluorescent element. The or one tag reader detects this property.

The tag can be a metallic element, e.g. a metallic strip, and the tag reader detects the presence or non-presence of a metallic element, e.g. in a generated magnetic field. The metallic element can additionally be detected by its glossy or phosphorescent or fluorescent behavior.

It is possible that an illumination source illuminates the place at which a tag is detected. In some implementations, however, the tag reader does not require an illumination source, in particular if a metallic element is used as a tag. In some implementations the tag reader can also work in complete darkness.

In yet a further embodiment the tag surface pointing to the tag reader in the chamber shows a barcode. In general the pattern of a barcode is not present on the object surface not yet wrapped. Therefore the presence of the barcode shows that the object surface is wrapped. In general the optical shape of a barcode distinguishes a barcode from the object surface. The barcode can be the same for several objects which are subsequently to be wrapped by the wrapping apparatus. It is also possible that the respective barcode distinguishes from object to object, see below.

In one embodiment the tag applicator prints, e.g. sprays, the barcode directly on the web. This embodiment can in particular be used if the web is a plastic sheet. In a further embodiment a label for the barcode is used. The tag applicator takes an empty label from a reservoir and prints the barcode onto the label. The label with the barcode is attached to the web. Or the empty label is attached on the web and the tag applicator prints a barcode onto the empty label on the web. This implementation is in particular preferably if a self-adhesive label is used. It is also possible that the tag applicator places an empty label onto the web and the or one tag reader or a further device prints a barcode onto the label. In place of a barcode a sequence of alphanumeric symbols can be used.

It is even possible that the presence of an empty label shows that the object surface is properly wrapped. In this implementation the empty label serves as the tag which is to be detected. The non-presence of such a label triggers the step that an alert is generated. A malfunction of the barcode printer does not cause a false alert of non-wrapping. A barcode or symbol sequence can be printed on the label after the web with the label has successfully been injected into the chamber.

In one embodiment at least one image of the object surface to be wrapped is displayed on a display unit, preferably a sequence of images. If the object surface is properly wrapped, at least one displayed image shows a tag. A human operator can inspect the displayed images.

In one implementation the images are displayed in every case, i.e. regardless whether or not the tag reader detects a tag or generates an alert. In a further embodiment the event that the alert is generated triggers the step of displaying the images or increasing the size of an image on the display unit. In yet a further implementation the images are displayed as a reaction to a user request. A human operator can inspect the displayed images and can decide if the object surface is indeed not properly wrapped or if a false alert is generated, e.g. due to a malfunction of the tag applicator or the tag reader or as the tag drops from the web.

In one embodiment the tag stores data about the object to be wrapped or successfully been wrapped, e.g.
- a unique identifier of the object,
- a property of the object (diameter, length, weight, applied pressure for forming the object, e.g.),
- a property of loose material (moisture, color, kind of crop material, e.g.) used for forming the object in the chamber,
- the geo-position at which the object is wrapped,
- an identifier of the agricultural field or further geographical region on which the object is wrapped,
- the date and time and/or duration of wrapping the object,
- the number of wrapping material layers and/or the length of the web placed around the object surface in the chamber,
- a unique identifier of the wrapping apparatus, and/or
- a unique identifier of a human operator using the wrapping apparatus.

Preferably the tag is a barcode, an RFID chip, or a further suitable mobile data storage device. The data is written on the tag when and/or after the tag applicator has applied the tag onto the web. It is possible that some data is stored on the tag before the tag is injected into the chamber and further data is stored on the same tag after the object surface is wrapped. This further data may depend on the result of the wrapping process.

The tag applicator applies the tag on the web. In one implementation the tag applicator additionally writes data onto the tag, e.g. by printing the barcode which codes the identifier or the symbol sequence or further data or storing data on an RFID chip. This implementation enables to store data outside of the chamber on the tag and in one implementation even before applying the tag onto the web. It is also possible that first the tag is applied on the web and later data is stored on the applied tag, in particular before the web with the tag is injected into the chamber.

The or every tag reader detects the presence of a tag. In a preferred embodiment the or at least one tag reader adjacent to the object surface additionally stores data on the tag. In this embodiment a property of the object or of the wrapping material can be stored wherein this property can only be detected after the web is injected into the chamber, e.g. a signal about the successful web injection or successful completion of the wrapping of the object surface.

In one implementation a code reader is needed for decrypting the stored data. It is also possible that the tag comprises an identifier or a further signal in a form in which a human can read it, e.g. a sequence of digits and/or letters and for further symbols.

In one embodiment exactly one tag per object to be wrapped is applied onto the web. If the same wrapping apparatus subsequently wraps several objects, the web is severed between the subsequent applications of two tags.

In an alternative embodiment the tag applicator subsequently applies two tags on that segment of the web which is used for wrapping the same object. In the case of a round-cylindrical object the distance between the two tags is preferably larger than the quarter of the circumferential length of the object to be wrapped and smaller than three quarters of this length, preferably equal to half of the length. In the case of a cuboid object two tags are preferably applied on two different surfaces of the object to be wrapped.

One reason for applying several tags: In the case that only one tag is applied and the wrapped object is deposited on the ground it may happen that the only tag points to the ground and cannot be red. The embodiment with two tags for the same object ensures that at least one tag on the web points vertically or angularly upwards after the wrapped object is deposited on the ground. Thanks to the embodiment with several tags for the same object it is in every case possible to read stored data from at least one tag. It is not necessary to regard the position of the tags on the object surface when depositing the wrapped object on the ground.

In one embodiment the tag applicator places at least two tags on the web wherein the web with the two tags is designated for wrapping the surface of the same object. If no malfunction occurs, the tag reader will detect both tags. In one implementation one tag has an initial lateral offset with respect to the other tag seen in the conveying direction of the web. This initial lateral offset is known by the construction and operating mode of the tag applicator. The tag reader does not only detect the presence or non-presence of the two tags but measures in addition the current lateral offset between the two tags on the wrap being placed on the object surface in the chamber. Preferably the object surface with the web and the two tags is conveyed along two tag readers which have a lateral offset. If the measured current lateral offset is below a threshold, the web is shifted together in an unintended way and may not cover the entire width of the object surface. The width is the dimension perpendicular to the direction in which the injected web is moved. The threshold may depend on the initial lateral threshold. In one application an alert is generated in this case.

According to the invention at least one tag reader monitors whether or not a tag in the chamber, i.e. on the object surface, is moved along this tag reader. According to one embodiment a further tag reader is positioned outside of the chamber and along that way which the web takes when being conveyed from the application position to the wrapping material inlet. Therefore the further tag reader is positioned between the application position and the wrapping material inlet. This further tag reader also monitors whether or not a tag is conveyed along the further tag reader. In the case that the further tag reader does not detect a tag, a further alert is generated. The further alert from the further tag reader preferably differs from an alert generated by the tag reader.

Possible reasons for the undesired event that no tag is conveyed from the application position along the further tag reader to the wrapping material inlet are:

The web is not conveyed at all.
The web is not properly guided and therefore not conveyed to the wrapping material inlet.
The tag applicator has a malfunction.
The tag is attached on the web but drops or is removed from the web before reaching the further tag reader.
The further tag reader does not operate properly.

Thanks to the further tag positioned upstream of the wrapping material inlet and upstream of the tag reader adjacent to the object surface a malfunction can be detected even earlier. The risk that the tag reader in the chamber generates a false alert is reduced. It is possible that a camera takes images from the web on its way from the application position to the wrapping material inlet. At least if the further tag reader does not detect the tag, these images are displayed on the display unit.

According to the invention a web of wrapping material is placed on the surface of the object in the chamber. In one embodiment the number of layers of wrapping material placed on the object surface or the length of the web applied up to now is measured. A counter counts how often the or one tag reader detects a tag on the web placed on the object surface. The number of layers or the web length is derived from the number of tag detections. If one tag is placed on the web, the searched number of layers equals the counted number of tag detections. If two tags are placed for the same object, the searched layer numbers is half of the counted detection number. The length of the web applied up to now is derived by using the counted numbers and the measured or given length of the object surface seen in the direction in which the injected web is moved.

In one application the wrapping apparatus according to the invention belongs to a bale forming and wrapping apparatus. This apparatus forms and wraps a bale in the chamber or forms the bale in a further chamber wherein the bale serves as the object to be wrapped. A bale forming means forms under pressure the bale in the chamber. Or the bale forming means forms the bale in the further chamber and the bale to be wrapped is moved from the further chamber into the chamber. In both cases the bale forming means serves as the object moving device which moves the bale to be wrapped in the interior of the chamber. At least one surface of the bale in the chamber is wrapped into an injected web of wrapping material. Later the wrapped bale is ejected or otherwise moved out of the chamber. The web around the bale surface prevents the ejected bale from falling apart. Using the wrapping apparatus according to the invention can prevent the undesired event that the bale is ejected or otherwise moved out of the chamber although the bale surface is not at all or not properly wrapped.

In one application the bale is formed and wrapped in the same chamber. In a further application the bale is formed in a further chamber, is moved into the chamber, and is wrapped in the chamber. At the same time further loose material can be injected into the further chamber such that the baler can operate continuously.

In one application the bale forming and wrapping apparatus forms round-cylindrical bales in a drum-shaped bale forming chamber. The bale forming means rotates the round bale in the bale forming chamber around its center axis. The circumferential surface of the bale is to be wrapped in the bale forming chamber or in a specific wrapping chamber.

In a further application the bale forming and wrapping apparatus forms cuboid bales in a pressing channel with a rectangular cross section. The bale forming means moves the cuboid bale in a direction parallel to the longitudinal axis of the channel. The four lateral rectangular surfaces of the cuboid bale which point to the channel sidewalls are to be wrapped.

It is possible that a wrapper wraps the entire surface of the round-cylindrical or cuboid bale outside of the bale forming chamber in a further web of wrapping material (baler-wrapper combination).

The bale forming and wrapping apparatus can be a part of an agricultural vehicle which moves over ground and picks up loose crop material from the ground or otherwise collects loose crop material. In an alternative application a further harvester, e.g. a combine harvester or a field chopper, outputs a flow of crop material or chaff which is directed towards the bale forming and wrapping apparatus and which is injected into the chamber.

The bale forming and wrapping apparatus can also be a part of a stationary plant which forms bales from recycling material or waste, e.g. cartridges, paper, or plastic parts.

It is also possible that the object to be wrapped is formed outside of the chamber, is moved into the chamber and is wrapped in the interior of the chamber by using the invention. The wrapped object is moved out of the chamber.

These and other aspects of the invention and of the preferred embodiment will be even more apparent from the detailed embodiment as described below and will be elucidated in detail there.

DETAILED DESCRIPTION OF EMBODIMENT

In the embodiment the invention is used on board of a round bale forming apparatus (baler) belonging to an agricultural harvester. The harvester is moved over ground. The round baler picks up loose crop material from the ground or receives loose crop material in a further way, forms subsequently from the loose material several round-cylindrical bales in a drum-shaped bale forming chamber, wraps the circumferential surfaces of the bales in the bale forming chamber into a respective part of web of wrapping material (a net, a plastic film, or several strands of twine), and ejects the wrapped bale out of the bale forming chamber.

The feature that the circumferential surface of a bale is wrapped prevents the undesired event that the bale falls apart after being ejected. It is desired to check whether or not the circumferential surface of a bale is actually wrapped while the bale is still in the bale forming chamber.

Every bale serves as an object to be wrapped. The bale forming chamber serves as the chamber. The round baler comprises the wrapping apparatus.

Figure 1:
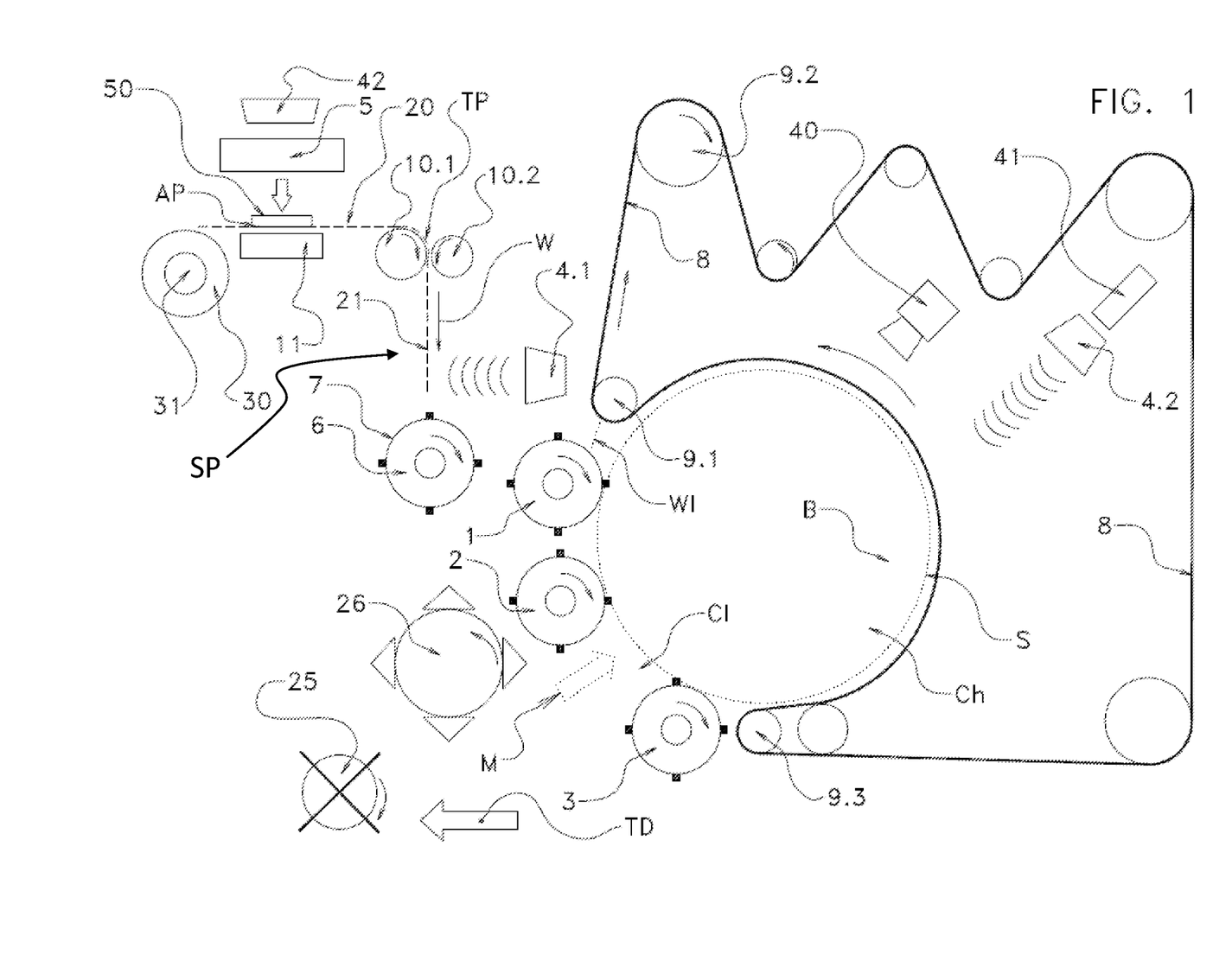
FIG. 1 shows in a side view a round baler after the tag has been applied and before the web with the tag enters the bale forming chamber.

FIG. 1 shows schematically in a side view a round baler on board of which the invention is used.

The round baler of FIG. 1 is moved over ground in a travelling direction TD (in FIG. 1 from right to left) and operates as follows:

A rotated pick-up unit 25 with several spring-mounted tines picks up loose crop material from the ground.

A driven conveying rotor 26 with several rigid tines conveys the loose picked-up crop material in a direction M through a feeding channel towards a crop material inlet Cl formed between two driven starter rollers 2, 3 with longitudinal ribs.

Optionally the conveyed crop material is cut into pieces in the feeding channel.

The conveyed crop material is injected through the crop material inlet Cl into a drum-shaped bale forming chamber Ch.

The circumferential surface of the bale forming chamber Ch is surrounded by the two driven starter rollers 2, 3 which form the two borders of the crop material inlet Cl, a further pressing roller 1, and one or several parallel endless pressing belts 8 guided around several deflecting rollers. The deflecting roller 9.2 is driven and moves the or every pressing belt 8. FIG. 1 shows further deflecting rollers, among them the idler rollers 9.1 and 9.3.

At least one deflecting roller (not shown) is mounted on a pivotal tensioning arm and tensions the or every pressing belt 8.

An increasing round-cylindrical bale B is formed and rotated under pressure in the bale forming chamber Ch.

At least one value indicative of the current bale diameter is measured several times, e.g. the pivoting angle of the tensioning arm for the movable deflecting rollers or the pressure which the pressed bale B applies onto the or every pressing belt 8 or onto the pivotal tailgate (not shown). It is also possible to use a contactless distance sensor for measuring the bale diameter.

After the round-cylindrical bale B has reached a given diameter, the wrapping procedure is started and the rotated bale B is wrapped in the bale forming chamber Ch into a given number of layers of a web of wrapping material (a net or a plastic foil or several strands of twine).

In the embodiment the bale B is formed in the chamber Ch which is surrounded by endless pressing belts 8 and increases during operation. It is further possible that the chamber Ch is surrounded by a sequence of pressing rollers.

In the embodiment the bale B is formed and wrapped in the same bale forming chamber Ch. It is also possible that the bale B is formed in one chamber, is moved into a further chamber, and is wrapped while being in the further chamber. Both chambers are provided on board of the same baler. At the same time loose crop material can be injected into the chamber (continuous baler). It is also possible that the loose material is injected into a buffering chamber and later from the buffering chamber into the bale forming chamber Ch as soon as space is available in the bale forming chamber Ch (non-stop baler).

In the embodiment a web 20 of wrapping material is pulled from a supply reel (wrapping material reservoir) 30. The hollow kernel of the supply reel 30 is rotatably kept by a transversal tube or by two lateral shaft stubs 31. The tube or shaft stubs 31 belong to an unrolling station. Two pulling rollers 10.1, 10.2 always clamp the web 20 in a touching position TP positioned outside of the chamber Ch. The pulling roller 10.1 is driven. The pulling roller 10.2 is biased against the driven pulling roller 10.1.

A loose end 21 of the web 20 sags downwards. Before starting the wrapping procedure the front edge of the web 20 is positioned at that position at which the web 20 is severed after the previous bale has been wrapped. After the wrapping procedure for the current bale is started, the pulling rollers 10.1, 10.2 are set into rotation. The rotating pulling rollers 10.1, 10.2 convey the clamped web 20 such that the web 20 is pulled from the supply reel 30. The loose end 21 of the web 20 increases (arrow W) until it reaches the conveying surface 7 of a rotating web feeding roller 6. The conveying surface 7 comprises several longitudinal ribs and conveys the web 20 towards a wrapping material inlet Wl. This wrapping material inlet Wl is positioned between the driven pressing roller 1 and those segments of the pressing belts 8 which are guided around the deflecting roller 9.1.

The web 20 is inserted through the wrapping material inlet Wl into the bale forming chamber Ch. The inserted web 20 is clamped between the rotated bale B on the one side and by the pressing rollers 1, 2, 3 and later by the pressing belts 8 on the other side. The rollers 1, 2, 3 and the belts 8 together serve as the object moving device. Preferably the web 20 is conveyed with a higher velocity after being inserted into the bale forming chamber Ch compared with a velocity achieved by the pulling rollers 10.1, 10.2.

After the web 20 is inserted into the bale forming chamber Ch and is clamped, the pulling rollers 10.1, 10.2 are set into an idler mode, e.g. by means of a clutch. The transfer of the pulling rollers 10.1, 10.2 into the idler mode can be performed after a given time span has passed or after it is detected that the web 20 is moved with the same velocity than the circumferential velocity of the bale B. The web 20 is further pulled from the supply reel 30. Several layers of wrapping material are placed around the circumferential surface of the rotated bale B.

A brake shoe or further braking body can be moved in a position in which it contacts a brake disk on one shaft stub 31 or the tube carrying the supply reel 30 or the circumferential surface of the supply reel 30 or one pulling roller 10.1, 10.2. The brake decelerates the supply reel 30 and ensures a sufficient tension of the injected web 20.

Preferably the length of the web 20 pulled from the supply reel 30 is measured, e.g. by counting the numbers of revolutions of one pulling roller 10.1, 10.2 or of the supply reel 30. The required web length is determined by the required number of web layers and by the measured bale diameter.

After the bale B is wrapped into the required number of layers, the web 20 is severed at a severing position SP. This severing position SP is positioned between the pulling rollers 10.1, 10.2 and the conveying surface 7 of the roller 6. After severing the web 20, a remaining web segment 21 is kept and clamped by the pulling rollers 10.1, 10.2 without moving it until the next bale is to be wrapped.

A tailgate (not shown) is opened and the wrapped bale B is ejected out of the bale forming chamber Ch and is deposited onto the ground. In one embodiment a tilting unit ("quarter turn", not shown) tilts the wrapped bale B onto one front face.

For properly wrapping the bale B in the bale forming chamber Ch, it is required that the web 20 is actually inserted through the wrapping material inlet Wl into the bale forming chamber Ch and is placed around the circumferential surface S of the bale B. The entire width of the circumferential surface of the bale B should be covered. But several malfunctions may occur:

The supply reel 30 can be empty.

It is possible that the pulling roller 10.1 is not driven at all or does not start to pull the web 20 at the proper time.

The idler roller 10.2 may not be biased sufficiently against the driven roller 10.1 such that a high slippage between the rollers 10.1, 10.2 and the web 20 occurs.

It may happen that the supply reel 30 does not rotate but is blocked such that the web 20 cannot be pulled from the supply reel 30.

The brake does not work properly and decelerates the supply reel 30 too strong, in particular before the web 20 reaches the bale forming chamber Ch.

It may happen that the web 20 does not reach the wrapping material inlet Wl but wraps around a pulling roller 10.1, 10.2, the web feeding roller 6, one pressing roller 1, 2, 3, or around the conveying rotor 26.

It is further possible that the web 20 is injected through the wrapping material inlet Wl into the bale forming chamber Ch but wraps around a starter roller 2 or 3 and does not reach the pressing belts 8.

It is also possible that the web 20 is properly injected but is conveyed through the crop material inlet Cl or through a nip between two rollers out of the bale forming chamber Ch.

The web may be torn, in particular after it has been clamped by the bale B and the object moving device 1, 2, 3, 8.

It is further possible that the web 20 is shifted together and has an insufficient width and does not reach from front face to front face of the bale B.

Thanks to the embodiment of the invention every one of such a malfunction is automatically detected. Thanks to the invention a usual web of wrapping material can be used. It is not necessary to use a specific kind of wrapping material. The invention does not restrict the kinds of loose material to be pressed to the bale B.

A tag applicator 5 is mounted on board of the baler and is positioned between the supply reel 30 on the lateral shaft stubs 31 and the wrapping material inlet Wl. The web 20 is conveyed through a nip between the tag applicator 5 and a supporting plate 11. This tag applicator 5 comprises a tag reservoir 42 with several tags. The tag applicator 5 automatically takes at least one tag 50 per bale out of the tag reservoir 42 and applies the or every taken tag 50 for this bale B onto the web 20. It is possible that the tag applicator 5 places several tags 50 for the same bale B on the web 20. Preferably a sensor detects the event that no tag at all—or an insufficient number of tags for the next object—is contained in the tag reservoir 42. In this case an alert that the tag reservoir 42 is empty is generated.

The event that the bale B has reached the required diameter triggers the wrapping procedure. In the embodiment the tag applicator 5 is triggered by the event that the wrapping procedure has started. The tag applicator 5 applies the tag 50 just before the pulling rollers 10.1 and 10.2 start to rotate therefore the tag 50 is applied onto a non-moving web 20. The supporting plate 11 supports the web 20 such that the tag applicator 5 presses the tag 50 from above against the supporting plate 11. Thanks to the supporting plate 11 the tag 50 is applied regardless of the tension of the web 20 in the application position AP.

Further implementations of the tag applicator 5 are possible. It is in particular possible that the tag applicator 5 sprays a tag 50 onto the moved web 20. It is also possible that the tag applicator 5 applies the tag 50 on the web 20 after the web 20 has been injected into the chamber Ch and has been clamped.

In the embodiment shown in FIG. 1 the application position AP at which the tag applicator 5 applies the tag 50 is positioned between the supply reel 30 and the touching position TP at which the two pulling rollers 10.1, 10.2 clamp and touch the web 20. Thanks to this embodiment the web 20 on which the tag 50 is already applied is conveyed through the gap between the pulling rollers 10.1, 10.2. The tag 50 points to the idler roller 10.2. The biased idler pulling roller 10.2 presses the tag 50 onto the web 20 of wrapping material. This implementation further reduces the risk that the applied tag 50 drops from the web 20.

In one embodiment one tag 50 per bale is used. In an alternative embodiment the tag applicator 5 applies behind the tag 50 a further tag 50.1 onto that segment of the web 20 which is used for the same bale B, cf. FIG. 2. In one implementation the distance between the two tags 50 and 50.1 is substantially equal to half the circumferential length of the round-cylindrical bale B. It is also possible that two tags 50, 50.1 for the same bale B are applied with a lateral offset, e.g. one tag 50 is applied near the left edge and the other tag 50.1 near the right edge of the web 20.

In one embodiment a first tag reader 4.1 serving as the further tag reader is positioned between the pulling rollers 10.1, 10.2 and the driven web feeding roller 6 and is mounted outside of the casing. Preferably the first tag reader 4.1 is positioned downstream of the severing position. This first tag reader 4.1 monitors whether or not the applied tag 50 is conveyed along the first tag reader 4.1 before the web 20 is injected into the bale forming chamber Ch. This tag 50 is placed on that segment of the web 20 which is dedicated for wrapping the bale B currently being in the chamber Ch. If no tag 50 is conveyed along the first tag reader 4.1, either the web 20 is not moved at all or not properly (too late or too slow), the tag applicator 5 malfunctions or the tag 50 is not applied properly on the web 20 but has already dropped, or the first tag reader 4.1 malfunctions.

The first tag reader 4.1 generates an alert if after the beginning of the wrapping procedure a given time span has passed and no tag 50 is detected. This given time span depends on the length of the path between the application position AP and the viewing point of the first tag reader 4.1 and
on the web conveying velocity.

If the tag 50 is attached properly, the tag 50 is conveyed together with the web 20 towards the wrapping material inlet Wl. The web conveying velocity is determined by measuring a value indicative of the circumferential velocity of the pulling rollers 10.1, 10.2 and optionally by using an estimation of the slippage between the web 20 and the pulling rollers 10.1, 10.2.

If the tag 50 is properly applied and the web 20 is properly conveyed, the applied tag 50 is conveyed together with the web 20 through the wrapping material inlet Wl into the bale forming chamber Ch. If no wrapping malfunction occurs, the web 20 with the tag 50 is conveyed along a second tag reader 4.2. This second tag reader 4.2 is in the embodiment positioned in the pivotal tailgate of the baler and has a viewing or sensing direction towards the circumferential surface S of the bale B in the bale forming chamber Ch. The bale forming chamber Ch is positioned between the crop material inlet Cl and the second tag reader 4.2. If no malfunction occurs, the tag 50 on the injected web 20 will be conveyed along the second tag reader 4.2 and the second tag reader 4.2 detects the existence of the tag 50 on the web 20. It is also possible to mount the second tag reader 4.2 at the stationary front housing and downstream from the crop material inlet Cl, e.g. adjacent to the starter roller 3 or even adjacent to the driven roller 9.2.

In one implementation the distance between the second tag reader 4.2 and the casing remains constant. In a further implementation an actuator 4.1 can move the second tag reader 4.2 with respect to the casing and thereby with respect to the bale surface S. The baler control unit generates control inputs for the actuator 4.1 depending on the measured diameter of the completed bale B. The actuator 4.1 keeps the distance between the second tag reader 4.2 and the bale surface S within a given range.

Figure 2:
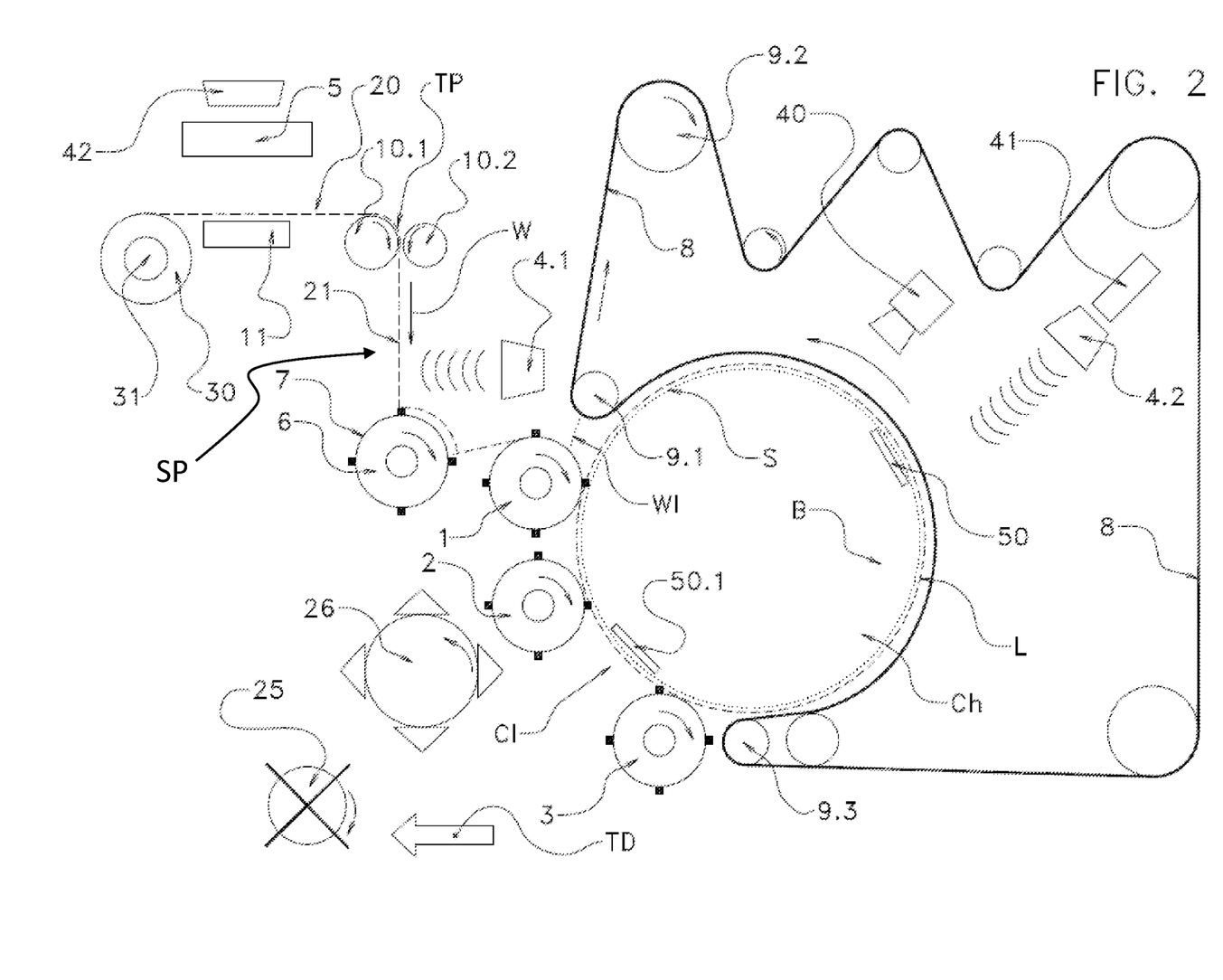
FIG. 2 shows the baler of FIG. 1 when the applied tag passes the second tag reader in the bale forming chamber.

FIG. 2 shows the baler of FIG. 1 after the web 20 with the tag 50 has been injected through the wrapping material inlet Wl into the bale forming chamber Ch. One layer L of the web 20 has already been placed around the circumferential surface S of the bale B. The tag 50 is currently in a position adjacent to the second tag reader 4.2. The second tag reader 4.2 detects the tag 50. No malfunction has occurred, no alert is generated. Optionally an in-order signal is generated if the second tag reader 4.2 detects the tag 50.

In one embodiment the tag reader 4.2 or a separated counter automatically counts how often a tag is conveyed along the tag reader 4.2. The number is used for deriving the length of the web 20 already placed around the bale surface S. After severing the web, a segment reaching from the severing position to the wrapping material inlet Wl will additionally be placed on the bale surface S. If the tag applicator 5 places one tag 50 per bale on the web 20, the length of the placed web 20 is the detection number multiplied with the circumferential length of the bale B plus the length of the path from the wrapping material inlet Wl to the tag reader 4.2. If the tag applicator 5 places several tags per bale on the web 20, the formula has to be amended properly. The length of the web 20 applied up to now is preferably compared with a given length threshold which is derived from the required number of web layers and the bale diameter.

In the embodiment the step that the tag applicator 5 applies the tag 50 on the web 20 is triggered by the start of the wrapping procedure. The actual time span used for conveying the tag 50 from the application position AP to a position adjacent to the second tag reader 4.2 depends the length of the path which the web 20 takes from the application position AP to the wrapping material inlet Wl,
the length of the path from the wrapping material inlet Wl to the position adjacent to the tag reader 4.2,
the circumferential velocity of the pulling rollers 10.1, 10.2,
the coinciding circumferential velocity of the pressing rollers 1, 2, 3 and the conveying velocity of the pressing belts 8,
optionally an estimated slippage between the web 20 and the pulling rollers 10.1, 10.2,
optionally an estimated slippage between the web 20 and the bale moving parts 6, 1, 2, 3, and
optionally a given tolerance for considering variations in the web conveying speed.

These parameters determine an actual time span during which the tag 50 is conveyed from the application position AP to a position adjacent to the tag reader 4.2 in the bale forming chamber Ch provided that no malfunction occurs. The time span starts when the tag applicator 5 applies the tag 50 in the application position AP A maximal time span is derived from these parameters before starting the wrapping procedure for the actual bale B such that the unknown actual time span is smaller than the maximal time span. The maximal time span can be derived in advance if all parameters remain fixed during operation, in particular if the bale forming chamber Ch has the same diameter for every bale B to be formed. If the baler can subsequently form bales with different diameters and if the length of the path from the wrapping material inlet Wl to the tag reader 4.2 depends on the bale diameter, the maximal time span is calculated during operation and before the wrapping operation for a bale starts.

If the tag reader 4.2 does not detect the tag 50 after this derived maximal time span has passed, a malfunction has occurred—either the web 20 is not properly injected or not properly conveyed or the second tag reader 4.2 has a malfunction or the tag applicator 5 has a malfunction. Or the tag 50 has been separated from the web 20 after having passed the first tag reader 4.1.

If the second tag reader 4.2 does not detect the tag 50 within the maximal time span, the second tag reader 4.2 generates an alert. In one embodiment this alert is communicated to the operator. In a further embodiment the wrapping procedure is automatically stopped. Preferably the alert is additionally signaled to the operator such that the operator is informed about the interruption. In particular the opening of the tailgate is inhibited until the operator triggers the opening. The operator can try to adjust or replace the supply reel 30, the pulling rollers 10.1, 10.2, the web brake, and/or the tag applicator 5 and can trigger a further wrapping procedure. Or the operator triggers the ejection of the non-wrapped bale B which will fall apart after being ejected.

In one embodiment at least one camera 40 is mounted on board of the baler in the interior of the casing and adjacent to the chamber Ch. This camera 40 can take images from the bale surface S to be wrapped. The camera can take images in the visible light spectrum or infrared or ultraviolet light spectrum. It is possible that the second tag reader 4.2 itself serves as the camera. It is possible that an illumination source illuminates the bale surface S. The images from the camera can be displayed to the operator on a display unit which is preferably mounted in the driver's cabin.

In one implementation the camera permanently takes images, e.g. with a given sample rate. In a further implementation the step that the second tag reader 4.2 generates an alert automatically triggers the camera to take images from the bale surface S.

In one implementation the images from the camera are in every situation displayed on the display unit. In a further implementation the images are not displayed during normal operation and the step that the alert is generated triggers the step that the images are displayed—even if the camera always takes images. In yet a further implementation several images from several cameras are displayed on the display unit. The wrapping malfunction alert triggers the step that the image from the bale surface S is increased.

In every implementation the alert is preferably additionally brought to the attention of the operator. The operator can inspect the displayed images and can check whether the object surface S is actually not properly wrapped or if a false alarm is generated.

Different kinds of tags 50 are possible. It is possible that two different kinds of tags are applied on that web segment which is wrapped around the same bale B. This embodiment provides a higher reliability.

In one application that surface of the tag 50 which points to the tag reader 5.2 comprises an element which has an optical property which distinguishes the tag 50 from the circumferential surface S of an unwrapped bale B. This optical property can be a reflecting property (glossiness) or a differing color or a distinguishing pattern which can be detected by using visible light or infrared or ultraviolet light, e.g. In this case the tag 50 is preferably applied on a surface on the web 20 which will point towards the second tag reader 4.2 after the web 20 is injected. Preferably the second tag reader 4.2 cooperates with an illumination source which illuminates the bale surface S and thereby the tag 50 on the web 20 provided that no malfunction occurs. The second tag reader 4.2 can operate with visible light or infrared or ultraviolet light. The illumination source generates the corresponding light.

The tag 50 can also comprise a metallic element. The second tag reader 4.2 can detect a metallic element. The tag reader 5.2 may cooperate with an electric field generator or may comprise a magnet. The tag reader 5.2 can detect the metallic tag 50 even if a pressing belt 8 or further bale forming member which is substantially non-metallic is positioned between the tag reader 5.2 and the bale surface S. The embodiment with the metallic tag 50 does not require an illumination source and works regardless of the side on which the tag 50 is applied.

In the embodiment with the first tag reader 4.1 that surface of the tag 50 which points to the first tag reader 4.1 distinguishes the tag 50 from the surface of the web 20 pointing to the first tag reader 4.1, e.g. by a distinguishing optical property or as the tag 50 is metallic and the web 20 is not metallic. Thereby the first tag reader 4.1 can distinguish a web 20 with a tag 50 from a web 20 without a tag.

In a further embodiment the tag 50 comprises a barcode which can optically be detected. In one implementation the barcode can be decrypted. In yet a further implementation the tag 50 is a chip, e.g. an RFID chip. This chip can be applied on the outer surface or on the inner surface of the web 20 with respect to the bale B. The tag reader 4.2 is positioned with respect to the tag 50 such that the tag reader 4.2 can detect the tag 50 on the web 20. The tag 50 can also have a pattern which can automatically be detected, e.g. a distinguishing geometric shape.

In one embodiment the tag 50 is able to store data, in particular if the tag 50 comprises a barcode or an RFID chip or a further chip. Data is stored on the tag 50—either by the tag applicator 5 or by the first and/or second tag reader 4.1, 4.2 additionally serving as a tag writer or by the tag applicator 5 as well as by the tag reader 4.2 or by a further writing device on board of the baler. Examples for data which is stored on the tag 50 are:

an identifier for the bale B,
an identifier for the baler and/or for the operator,
a measured property of the crop material pressed to the bale B, e.g. the moisture or color or chemical composition or mass flow,
a physical property of the bale B, e.g. its diameter or weight or the pressure applied to the crop material when forming the bale or the maximal length of a crop material piece,
the geo-position at which the bale formation is completed or the bale surface S is wrapped,
an identifier of the agricultural field or further geographical area on which the bale B was formed and wrapped,
the date and time point or duration of forming and/or of wrapping the bale B,
a measured environmental condition, e.g. the moisture of the surrounding air,
the number of wrapping material layers which are to be placed or have successfully been placed around the surface of the bale B, and/or
an identifier for the kind of wrapping material or a physical or further property of the wrapping material.

In one embodiment the data which is stored on the storing device (chip or barcode, e.g.) belonging to the tag 50 can be read with a suitable reading device. It is also possible to write a bale identifier or a further symbol in a human-readable form on the tag 50.

In one embodiment a wired or wireless data connection is at least temporarily established between the bale forming and wrapping apparatus (baler) and a remote data processing center. The baler transmits data about the wrapped bale B and optionally about the used baler to the remote data processing center, including a unique identifier for the wrapped bale B. This embodiment makes it possible that only the unique bale identifier is stored on the tag 50 itself.

The tag 50 needs to store less information. Further information about the bale is transmitted to the remote data processing center together with the unique identifier. The remote data processing center can connect the wrapped bale B with the transmitted information by means of the unique bale identifier.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

| | |
|---|---|
| 1 | driven pressing roller with ribs, touches the bale surface S, forms the lower border of the wrapping material inlet WI |
| 2 | upper driven starter roller with ribs, touches the bale surface S, forms the upper border of the crop material inlet CI |
| 3 | lower driven starter roller with ribs, touches the bale surface S, forms the lower border of the crop material inlet CI |
| 4.1 | first tag reader for detecting a tag 50 on the sagging loose end of the web 20, positioned between the pulling rollers 10.1, 10.2 and the wrapping material inlet WI |
| 4.2 | second tag reader for detecting a tag 50 on the injected web 20, positioned in the interior of the casing, mounted at the pivotal tailgate |
| 5 | tag applicator for applying a tag 50, 50.1 onto the web 20, cooperates with the supporting plate 11 |
| 6 | driven web feeding roller with the conveying surface 7 |
| 7 | conveying surface of the driven web feeding roller 6, comprises longitudinal ribs |
| 8 | parallel pressing belts guided around the deflecting rollers 9.1, 9.2, 9.3 |
| 9.1, 9.3 | deflecting idler rollers for guiding and deflecting the pressing belts 8 |
| 9.2 | driven deflecting roller for moving the pressing belts 8 |
| 10.1 | driven pulling roller, clamps the web 20 together with the idler pulling roller 10.2 |
| 10.2 | idler pulling roller, biased against the driven pulling roller 10.1, clamps the web 20 together with the driven pulling roller 10.1 |
| 11 | supporting plate, positioned opposite to the tag applicator 5 |
| 20 | web of wrapping material, pulled from the supply reel 30, to be placed around the bale surface S |
| 21 | sagging loose end of the web 20 |
| 25 | pick-up unit |
| 26 | conveying rotor with rigid tines, conveys crop material M through the feeding channel towards the crop material inlet CI |
| 30 | supply reel with wrapping material, rotatably kept by the shaft stubs 31 |
| 31 | lateral shaft stubs for holding the supply reel 30, belong to the unrolling station |
| 40 | camera which can take images from the bale surface S |
| 41 | actuator for changing the distance between the tag reader 4.2 and the bale surface S |
| 42 | tag reservoir |
| 50 | tag, applied by the tag applicator 5 onto the web 20, to be detected by the tag readers 4.1, 4.2 |
| 50.1 | further tag used for the same bale B |
| AP | application position at which the tag applicator 5 applies the tags 50 and 50.1 onto the web 20 |
| B | round-cylindrical bale with the circumferential surface S |
| Ch | drum-shaped bale forming chamber in which the bale B is formed and wrapped |
| CI | crop material inlet, delimited by the two driven starter rollers 2, 3 |
| L | layer of wrapping material placed around the bale surface S in the chamber Ch |
| M | flow of crop material into the chamber Ch |
| S | circumferential surface of the round-cylindrical bale B, to be wrapped into web 20 |
| TP | touching position at which the pulling rollers 10.1, 10.2 touch and clamp the web 20 |
| W | conveying direction of the web 20 |
| WI | wrapping material inlet, delimited from below by the pressing roller 1 and from above by those segments of the belts 8 which are guided around the deflecting roller 9.1 |

The invention claimed is:

1. A wrapping apparatus comprising:

a chamber arranged for containing a bale of crop material to be wrapped;

a bale moving device;

a reservoir holder arranged for holding a reservoir with wrapping material; and at least one tag reader, wherein the bale moving device is arranged to move the bale contained in an interior of the chamber with respect to the reservoir holder, wherein the wrapping apparatus is arranged:

to engage a web of wrapping material taken from the reservoir held by the reservoir holder;

to move the engaged web towards a wrapping material inlet; and to inject the moved web through the wrapping material inlet into the chamber, wherein the bale moving device and the moved bale are arranged to clamp and jointly move the injected web, thereby wrapping at least one surface of the bale in the chamber into the injected web, and wherein the at least one tag reader is arranged to monitor whether or not at least one tag is moved along the at least one tag reader and to generate an alert if no tag is detected, wherein the wrapping apparatus further comprises a severing position located between the reservoir and the wrapping material inlet, and a tag applicator, and the tag applicator is arranged to apply in an application position the at least one tag onto the web of wrapping material taken from the reservoir, wherein the application position is positioned between the reservoir holder and the severing position, and wherein the wrapping apparatus is arranged to engage, to move, and to inject into the chamber the web on which the at least one tag is applied and to convey in the chamber the bale surface which is wrapped with the web along the at least one tag reader.

2. The wrapping apparatus according to claim 1, wherein the wrapping apparatus comprises a material inlet guiding into the chamber, and the chamber is positioned between the material inlet and the tag reader along which the bale surface is conveyed.

3. The wrapping apparatus according to claim 1, wherein the at least one tag reader along which the bale surface is moved is arranged to generate the alert if the at least one tag reader does not detect the at least one tag within a given or calculated time span after the beginning of a wrapping procedure or the application of the at least one tag or the injection of the web into the chamber.

4. The wrapping apparatus according to claim 3,
wherein the time span depends on at least one of the following given or measured parameters:
a length of the path from the application position to the wrapping material inlet,
a length of the path along which the bale surface is conveyed from the wrapping material inlet to the at least one tag reader,
a conveying velocity of the web towards the wrapping material inlet,
a velocity with which the bale surface is moved in the chamber.

5. The wrapping apparatus according to claim 1,
wherein the wrapping apparatus comprises a web pulling device positioned outside of the chamber,
wherein the web pulling device is arranged to touch the web of wrapping material in a touching position and to pull the touched web of wrapping material from the reservoir, and
wherein the application position of the tag applicator is positioned between the reservoir holder and the touching position of the web pulling device.

6. The wrapping apparatus according to claim 1, wherein the wrapping apparatus comprises a counter and a wrapping measuring unit,
wherein the counter is arranged to count how often the at least one tag reader detects the at least one tag while the bale surface which is wrapped with the web is conveyed in the chamber along the at least one tag reader, and
wherein the wrapping measuring unit is arranged to measure a length of the applied web on the bale surface in the chamber depending on the measured number of tag detections and a circumferential length of the bale surface seen in the direction in which the bale is moved.

7. The wrapping apparatus according to claim 1, wherein the wrapping apparatus comprises a further tag reader positioned along the path which the web takes from the application position to the wrapping material inlet,
wherein the further tag reader is arranged to detect whether or not the at least one tag is moved along the further tag reader and to generate a further alert if no tag is detected.

8. The wrapping apparatus according to claim 1, wherein the wrapping apparatus comprises at least one tag writer,
wherein the at least one tag applied onto the web is suitable for storing data, and
wherein the at least one tag writer is arranged to write data onto the at least one tag while the at least one tag applied on the web is moved along the at least one tag writer.

9. The wrapping apparatus according to claim 8,
wherein the at least one tag writer serves as the at least one tag reader and as the tag writer.

10. The wrapping apparatus according to claim 9, wherein the at least one tag reader along which the bale surface is conveyed additionally serves as the at least one tag writer.

11. The wrapping apparatus according to claim 1, wherein the wrapping apparatus comprises at least one additional tag reader,
wherein the tag applicator is arranged to apply in the application position two tags onto the web designated for the same bale,
wherein an initial lateral offset between the applied two tags occurs, and
wherein the wrapping apparatus is arranged to convey in the chamber the bale surface with the web and both applied tags along the at least one tag reader and the at least one additional tag reader and to derive a value indicative of the current lateral offset between the two tags both being on the bale surface in the chamber.

12. The wrapping apparatus according to claim 1, wherein the wrapping apparatus further comprises a camera which is arranged for taking at least one image of the bale surface to be wrapped and a display unit arranged for displaying at least one image taken by the camera,
wherein the wrapping apparatus is arranged to display the at least one image of the bale surface on the display unit if the alert that no tag is detected is generated.

13. The wrapping apparatus according to claim 1, wherein the tag applicator comprises a tag reservoir and a reservoir sensor,
wherein the tag applicator is arranged to take the at least one tag out of the tag reservoir and to apply the at least one taken tag on the web, and
wherein the reservoir sensor is arranged to generate an alert if the tag reservoir is empty.

14. The wrapping apparatus according to claim 1, wherein a distance between the at least one tag reader along which the bale surface is conveyed and the bale surface is variable, and the wrapping apparatus comprises a tag reader actuator which is arranged for moving the at least one tag reader with respect to the bale surface such that the distance between the at least one tag reader and the bale surface is kept within a given range.

15. A bale forming and wrapping apparatus comprising:
a bale forming means providing the chamber or a further chamber; and
the wrapping apparatus according to claim 1, wherein the bale forming and wrapping apparatus is arranged to inject loose material into the chamber or into the further chamber, wherein the bale forming means is arranged to form from the injected loose material in the chamber or in the further chamber a bale serving as the bale to be wrapped, and wherein the bale forming means or a further device serving as the bale moving device and the moved bale are arranged to clamp and jointly move the injected web, thereby wrapping at least one surface of the bale in the chamber.

16. A method for wrapping a bale by using a wrapping apparatus comprising:
 a chamber containing the bale to be wrapped;
 a bale moving device,
 a reservoir holder for holding a reservoir with wrapping material; and
 at least one tag reader,
 wherein the method comprises the steps of:
 moving, by the bale moving device, the bale in an interior of the chamber with respect to the reservoir holder;
 taking a web of wrapping material from the reservoir held by the reservoir holder;
 engaging and moving the web towards a wrapping material inlet;
 injecting the moved web through the wrapping material inlet into the chamber;
 clamping and jointly moving the injected web by the bale moving device and the moved bale such that at least one surface of the bale in the chamber is wrapped into the injected web;
 monitoring, by the at least one tag reader, whether or not at least one tag is moved along the at least one tag reader and generating, by the at least one tag reader, an alert if no tag is detected, wherein the wrapping apparatus further comprises a severing position located between the reservoir and the wrapping material inlet, and a tag applicator;
 applying, by the tag applicator, in an application position the at least one tag onto the web which is taken from the reservoir, wherein the application position is positioned between the reservoir holder and the severing position;
 injecting the web into the chamber after the tag was applied on it; and
 conveying an bale surface which is wrapped with the web to which the tag is applied in the chamber along the or along at least one tag reader.

17. The wrapping method according to claim 16, wherein the wrapping apparatus comprises a further tag reader, and wherein the method further comprises the steps of:
 moving the web from the application position along the further tag reader to the wrapping material inlet; and monitoring, by the further tag reader, whether or not the tag is present on the web moved along the further tag reader.

18. The wrapping method according to claim 16, further comprising the step of the at least one tag reader along which the bale surface is conveyed triggering the alert when the at least one tag reader does not detect the tag within a given or calculated time span,
 wherein the time span commences when the tag is applied on the web or the movement of the web starts or when the web is injected into the chamber.

19. The wrapping method according to claim 16, further comprising the step of
 applying, by the tag applicator, in the application position a further tag onto the web,
 wherein a distance between the applied tag and the applied further tag is smaller than the circumferential length of the bale surface seen in the direction in which the bale is moved.

20. The wrapping method according to claim 16, wherein the wrapping apparatus further comprises:
 a camera, and
 a display unit,
 wherein the method further comprises the step of taking, by the camera, at least one image of the bale surface to be wrapped while the bale is moved in the chamber, and
 wherein the step that the at least one tag reader along which the bale surface is moved generates the alert triggers the step that the at least one image of the bale surface is displayed on the display unit.

21. A method for forming and wrapping a bale by using a bale forming and wrapping apparatus comprising:
 a bale forming means providing a chamber or a further chamber;
 a reservoir holder for holding a reservoir with wrapping material,
 at least one tag reader and
 a tag applicator,
 wherein the method comprises the steps of:
 injecting loose material into the chamber or into the further chamber;
 forming, by the bale forming means, in the chamber or in the further chamber from the injected loose material the bale serving as the bale to be wrapped;
 moving, by the bale forming means or a further device serving as the bale moving device, the bale in an interior of the chamber with respect to the reservoir holder; and
 performing the wrapping method according to claim 20 for wrapping at least one surface of the moved bale in the chamber.

* * * * *